(12) United States Patent
Balmer (10) Patent No.: US 10,007,172 B2
(45) Date of Patent: Jun. 26, 2018

(54) MULTIFUNCTION POWERED HAND GRIP FOR DEVICES

(71) Applicant: DayMen US, Inc., Petaluma, CA (US)

(72) Inventor: Noah Balmer, Santa Rosa, CA (US)

(73) Assignee: Vitec Holdings Italia SRL, Cassola (IT)

( * ) Notice: Subject to any disclaimer, the term of this patent is extended or adjusted under 35 U.S.C. 154(b) by 0 days. days.

(21) Appl. No.: 15/257,882

(22) Filed: Sep. 6, 2016

(65) Prior Publication Data

US 2017/0212412 A1  Jul. 27, 2017

Related U.S. Application Data (60) Provisional application No. 62/213,946, filed on Sep. 3, 2015.

(51) Int. Cl.
  *G03B 17/56*  (2006.01)
  *F16M 13/04*  (2006.01)
  *F16M 11/10*  (2006.01)

(52) U.S. Cl.
  CPC .......... *G03B 17/563* (2013.01); *F16M 11/10* (2013.01); *F16M 13/04* (2013.01)

(58) Field of Classification Search
  CPC ............................ G03B 17/563; F16M 13/04
  USPC ........................................................ 396/420
  See application file for complete search history.

(56) References Cited

U.S. PATENT DOCUMENTS 9,897,898 B2 * 2/2018 Kennair, Jr. ......... G03B 17/561
2014/0340839 A1 * 11/2014 Liniger ................. G06F 1/1632
                                                              361/679.43

* cited by examiner

*Primary Examiner* — Christopher Mahoney
(74) *Attorney, Agent, or Firm* — Michael A. Guth (57) ABSTRACT

A handgrip adapted to support an imaging device, such as a digital video recorder. The handgrip may have an internal battery which provides auxiliary power to the device mounted thereon. The handgrip may have connectors with allow the plugging in of a jumper cable from the device to the handgrip to allow for the provision of power. The handgrip may be adapted to be recharged using standard connector interfaces.

9 Claims, 13 Drawing Sheets

MULTIFUNCTION POWERED HAND GRIP FOR DEVICES

CROSS-REFERENCE TO RELATED APPLICATIONS

This application claims priority to U.S. Provisional Patent Application No. 62/213,946 to Balmer, filed Sep. 3, 2016, which is hereby incorporated by reference in its entirety.

BACKGROUND

Field of the Invention

This invention relates to handgrips, and more specifically to a handgrip with an internal battery.

Description of Related Art

What is called for is a powered handgrip that allows for support of a device such as a digital video camera, and which also may provide auxiliary power for the device.

SUMMARY

A powered handgrip adapted to support an imaging device, such as a digital video recorder. The handgrip may have an internal battery which provides auxiliary power to the device mounted thereon. The handgrip may have connectors with allow the plugging in of a jumper cable from the device to the handgrip to allow for the provision of power. The handgrip may be adapted to be recharged using standard connector interfaces.

DETAILED DESCRIPTION

In some embodiments of the present invention, as seen in FIGS. 1A-D, a powered handgrip has a handle 101 and a device mounting interface 102. In some aspects, the device mounting interface 102 may be adapted to couple to an intermediate clip portion which supports the device to be mounted. In some aspects, the device may be a video camera. In some aspects, the device may be a cellular telephone, which may be used as a camera or video camera. In some aspects, the handle 101 may be cylindrical.

A power interface portion 103 may reside in a recess in the handle 101. An access door 106 may cover the recess and may open and close using hinges, or may be removable. A plurality of electrical connectors 104, 105 may reside within the recess. A connector 104 may be adapted to route power from an internal battery to the supported device via a power cord. Another connector 105 may be adapted to receive power to recharge the battery via a charging cord.

In some embodiments of the present invention, as seen in FIGS. 2A-D, a powered handgrip 112 has a textured grip 107 around the outside of the handle 101. The textured grip 107 may be of a resilient material to facilitate secure holding of the powered handgrip 112 by the user. The powered handgrip 112 may have a movable clip ring 108 which may allow for the fastening of a lanyard or other means for securing the powered handgrip 112.

In some aspects, the device mounting interface 102 may have further device interface portions, such as an upper mounting interface portion 109, which may include a threaded post 110. A pin fastener 111 may allow for adjustment of the upper mounting interface portion 109 and tightening of it in a desired location.

Figure 1A:
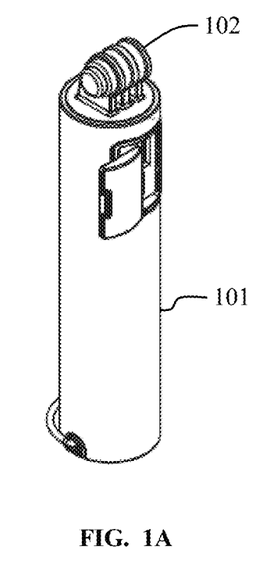
FIGS. 1A-D are views of a multi-function handgrip according to some embodiments of the present invention.
Figure 1B:
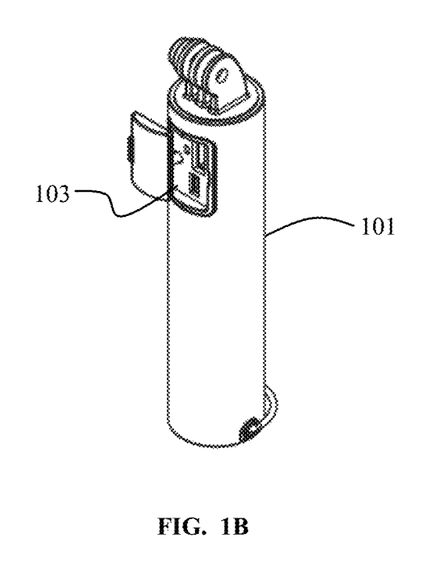
Figure 1C:
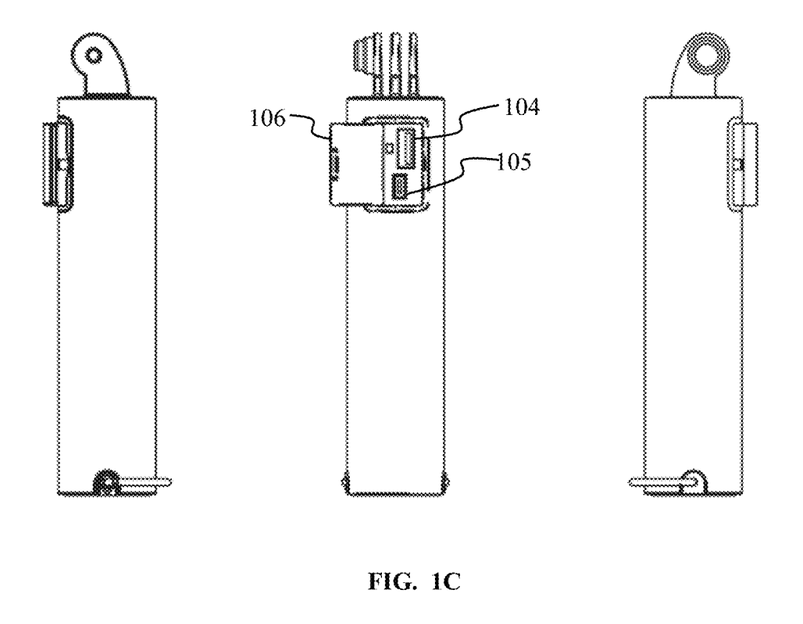
Figure 1D:
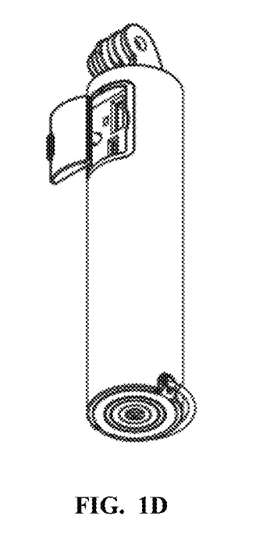
Figure 2A:
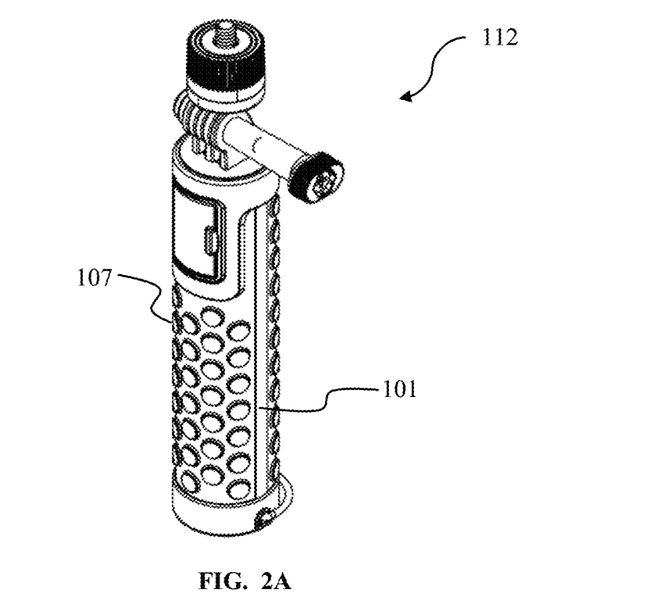
FIGS. 2A-D are views of a multi-function handgrip according to some embodiments of the present invention.
Figure 2B:
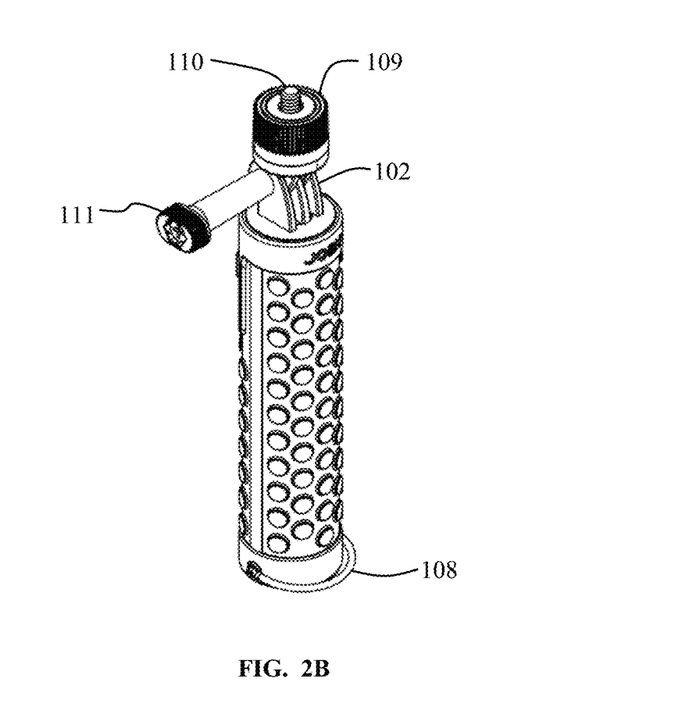
Figure 2C:
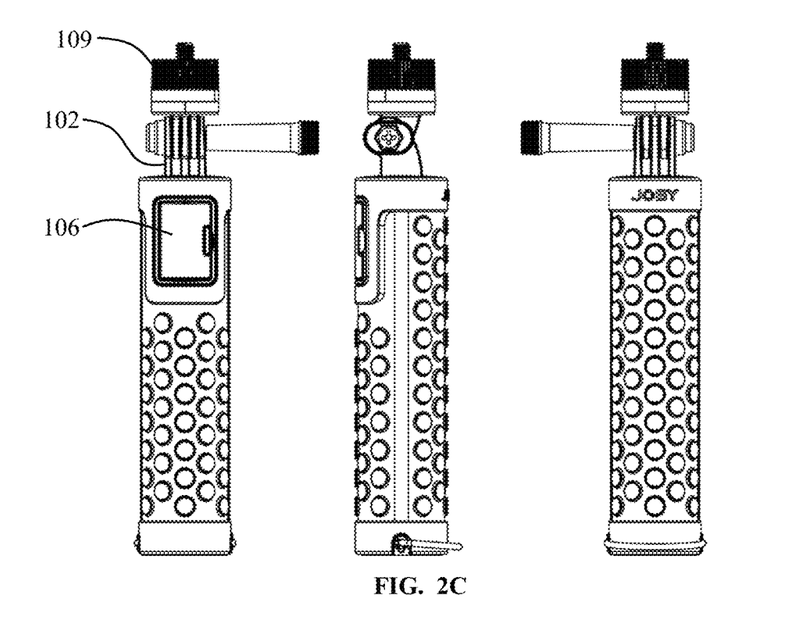
Figure 2D:
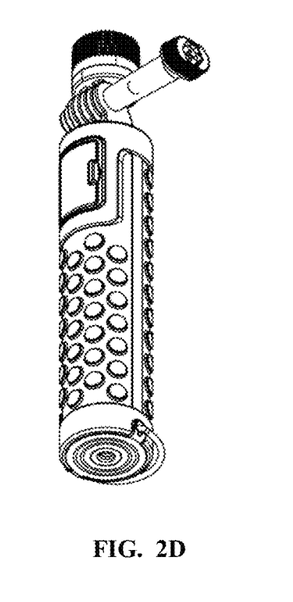
Figure 3A:
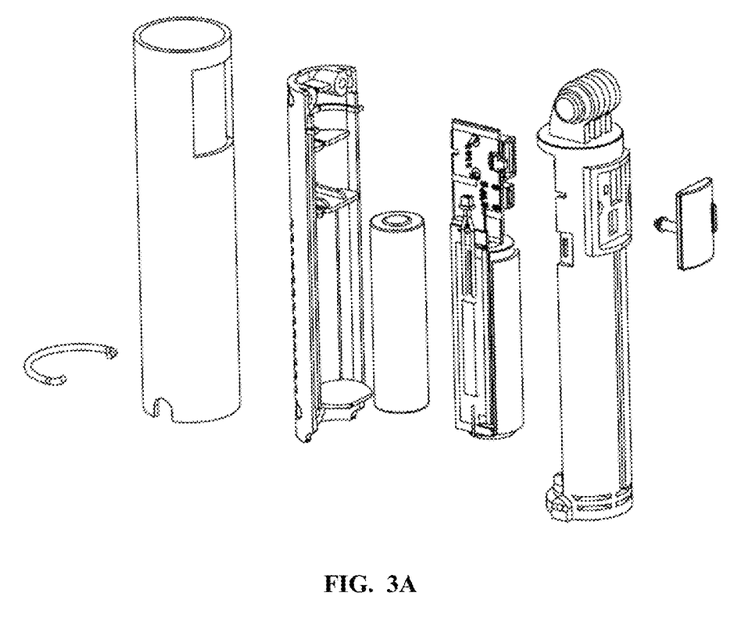
FIGS. 3A-B are exploded views of a multi-function handgrip according to some embodiments of the present invention.
Figure 3B:
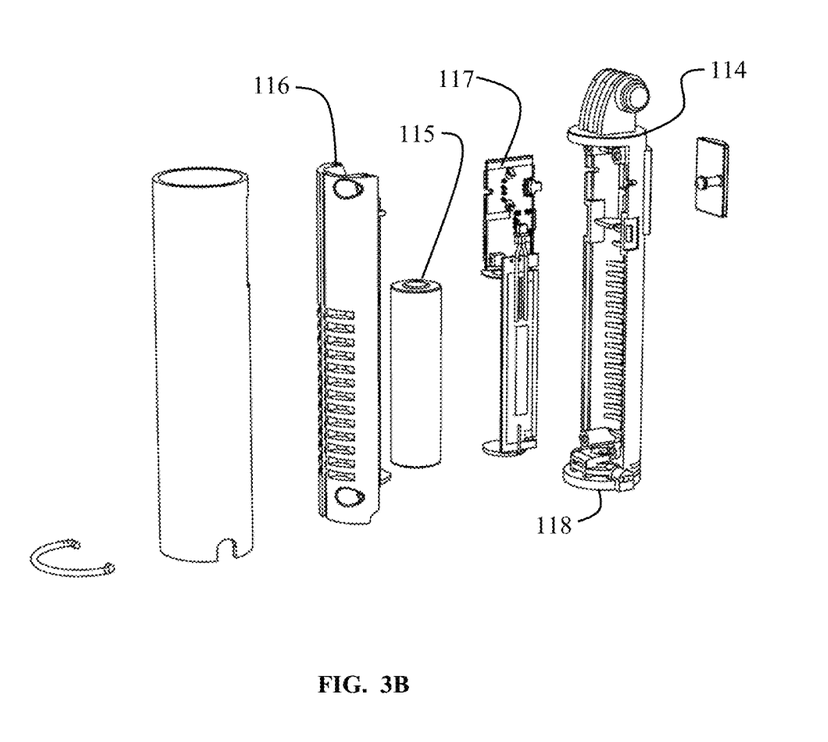

In some embodiments of the present invention, as seen in FIGS. 3A-B, the powered handgrip is seen in exploded view illustrating internal structure and components. The underlying structure of the handle may have a first half 114 and a second half 116, which, when joined together, provide the structural aspect of the handle. Within the interior of the joined halves resides a battery 115. A battery mount 118 may be coupled to an electronics portion 117 adapted to properly provide power to the device, and to receive power in order to recharge the battery. In an exemplary embodiment the battery is a lithium-ion battery providing 5 volts with a capacity of 2600 mAh.

Figure 4A:
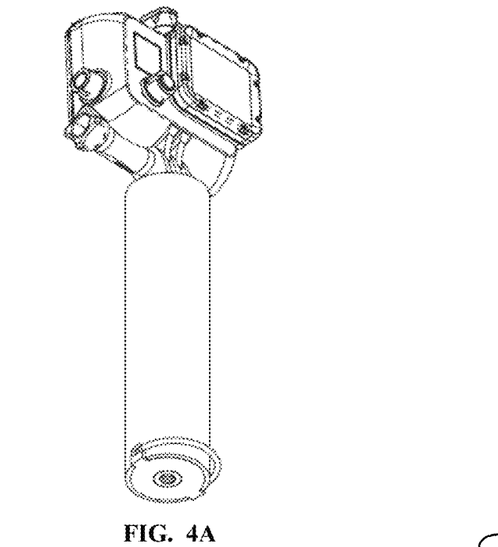
FIGS. 4A-B are views of a multi-function handgrip with a device mounted thereon according to some embodiments of the present invention.
Figure 4B:
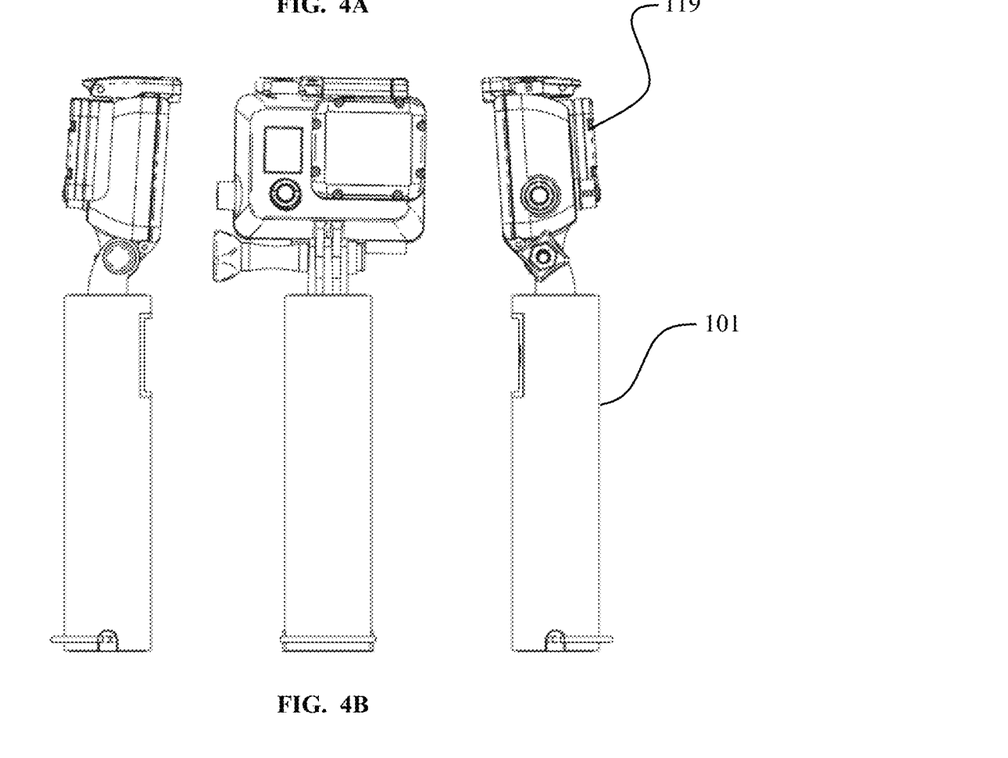
Figure 5:
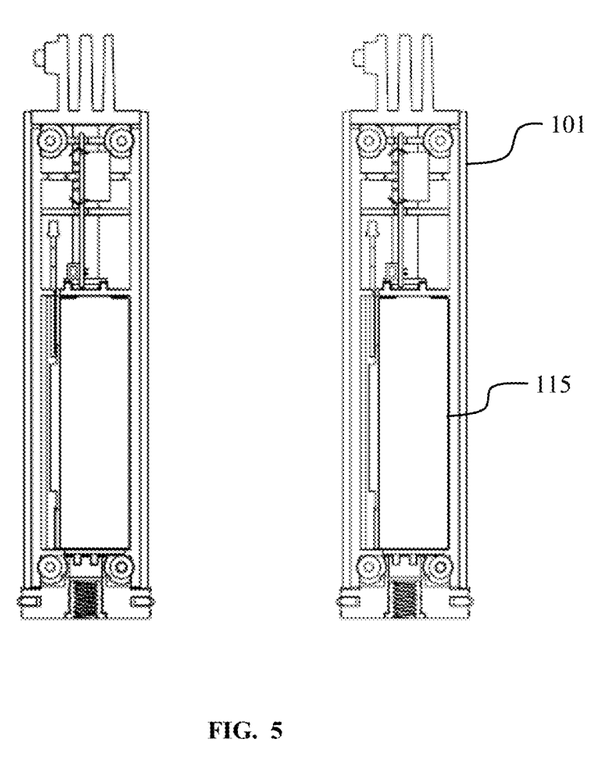
FIG. 5 is a view of a multi-function handgrip with a device mounted thereon according to some embodiments of the present invention.
Figure 6:
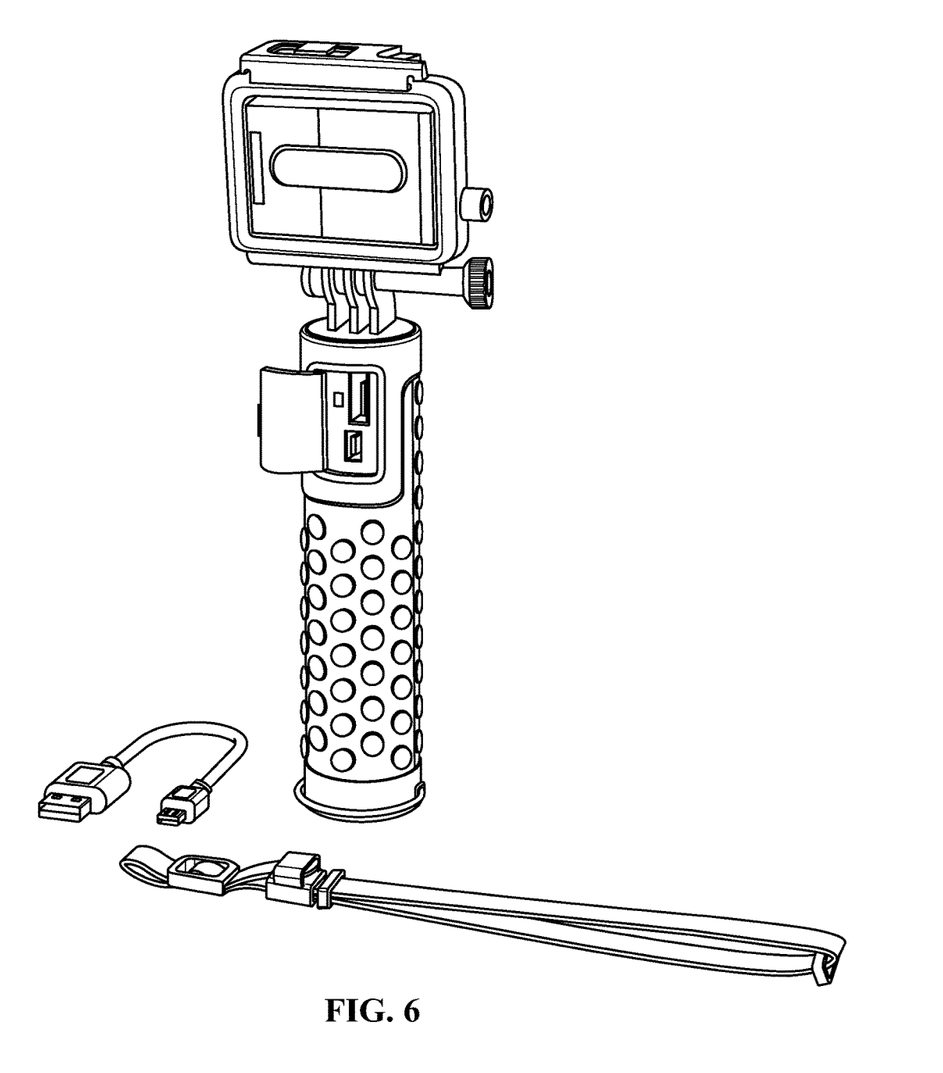
FIG. 6 is a photograph of a multi-function handgrip according to some embodiments of the present invention.
Figure 7:
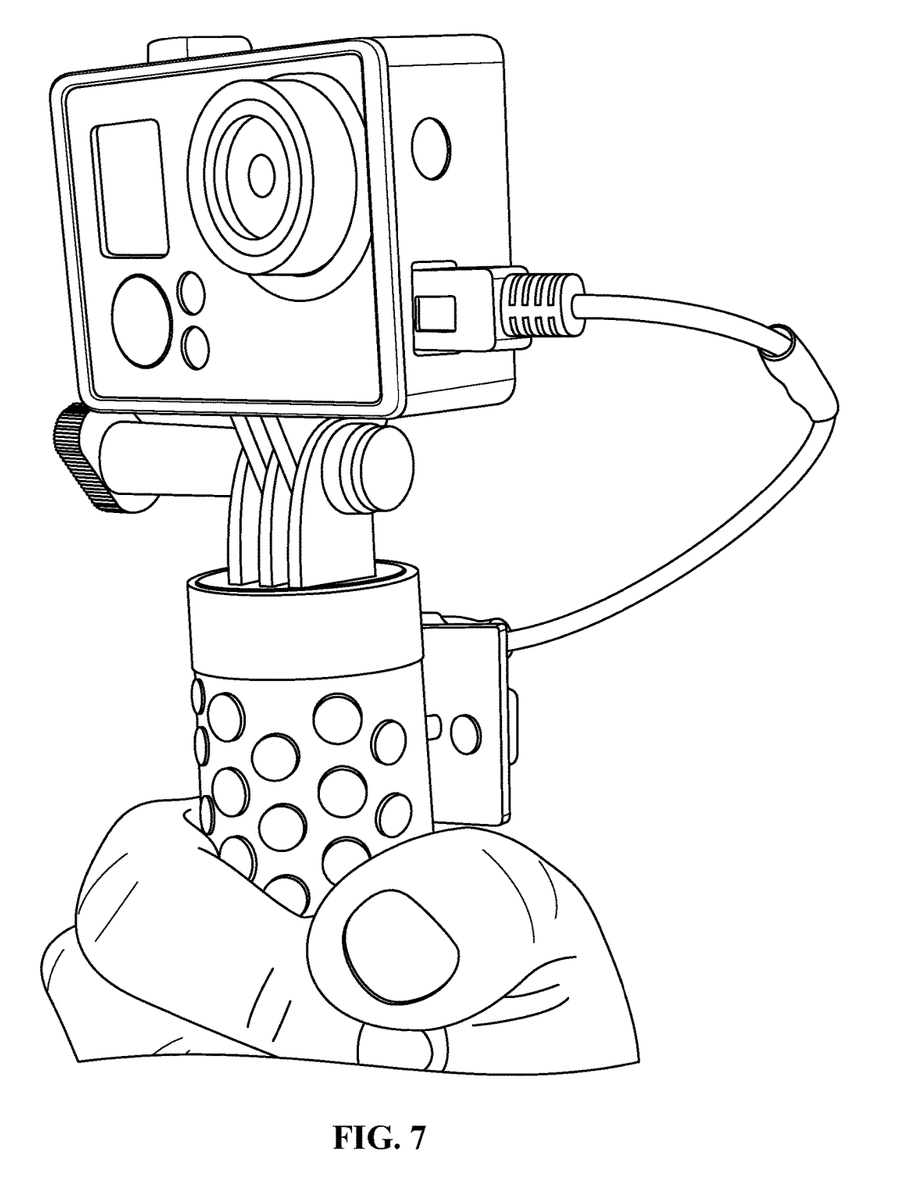
FIG. 7 is a photograph of a multi-function handgrip according to some embodiments of the present invention.
Figure 8:
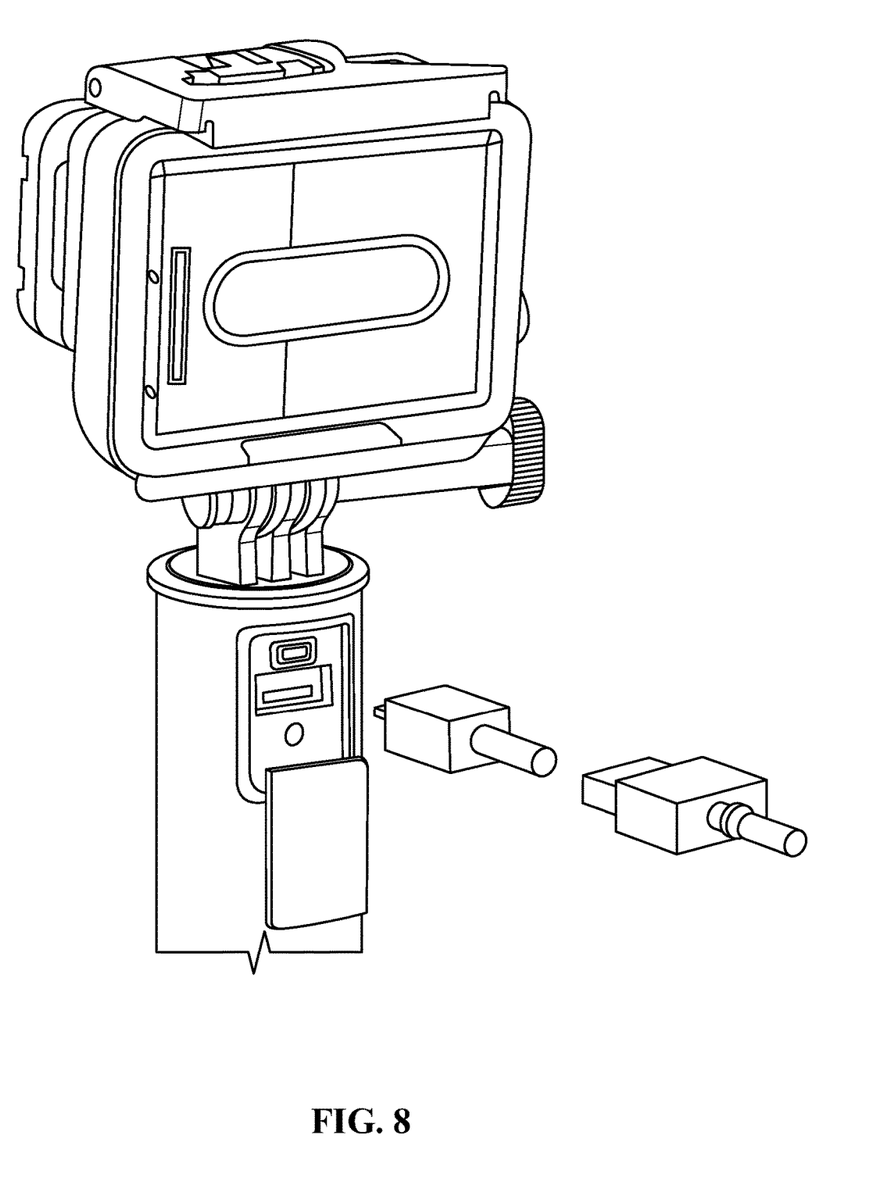
FIG. 8 is a photograph of a multi-function handgrip according to some embodiments of the present invention.
Figure 9:
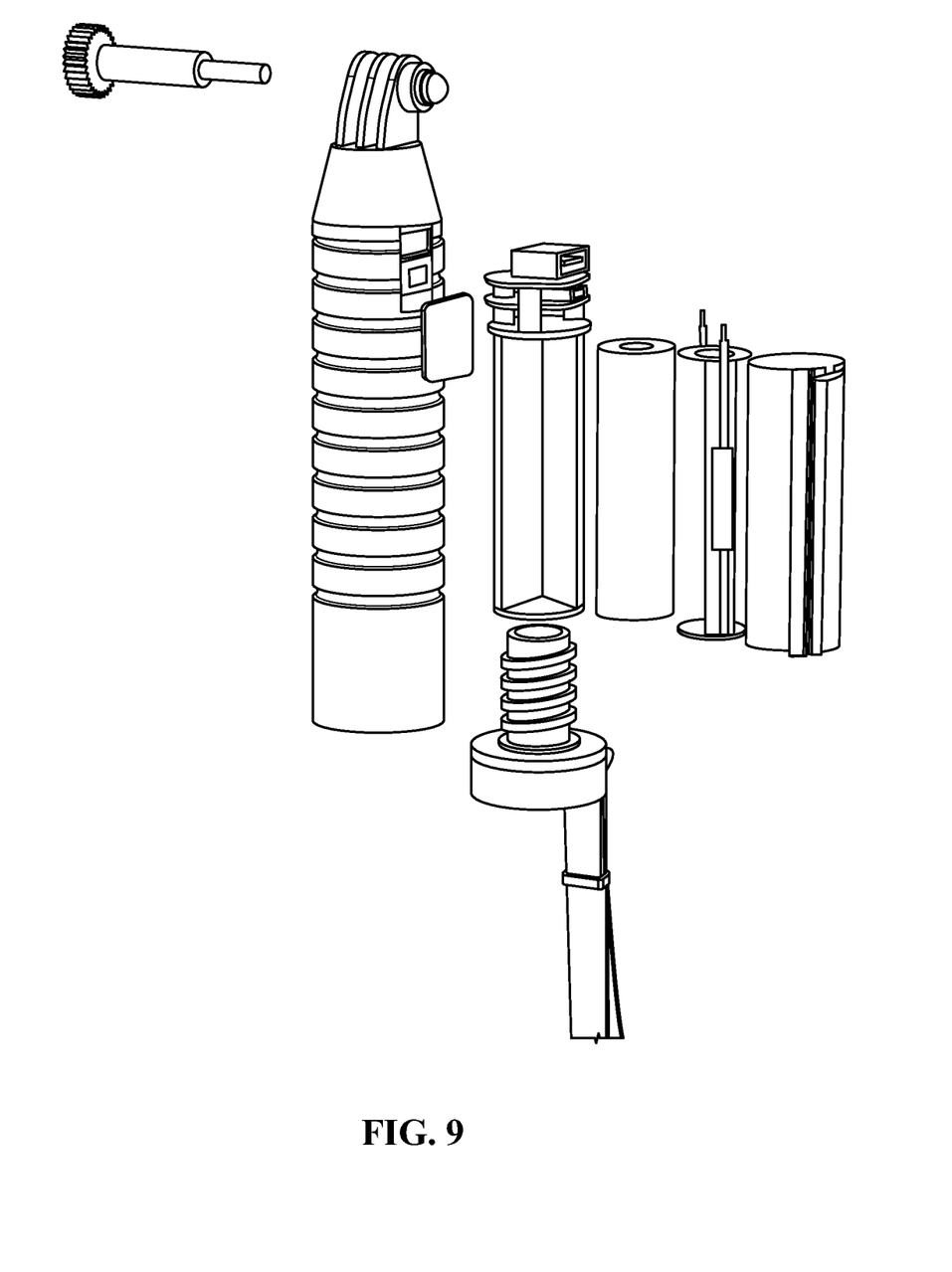
FIG. 9 is an exploded view of a multi-function handgrip according to some embodiments of the present invention.
Figure 10:
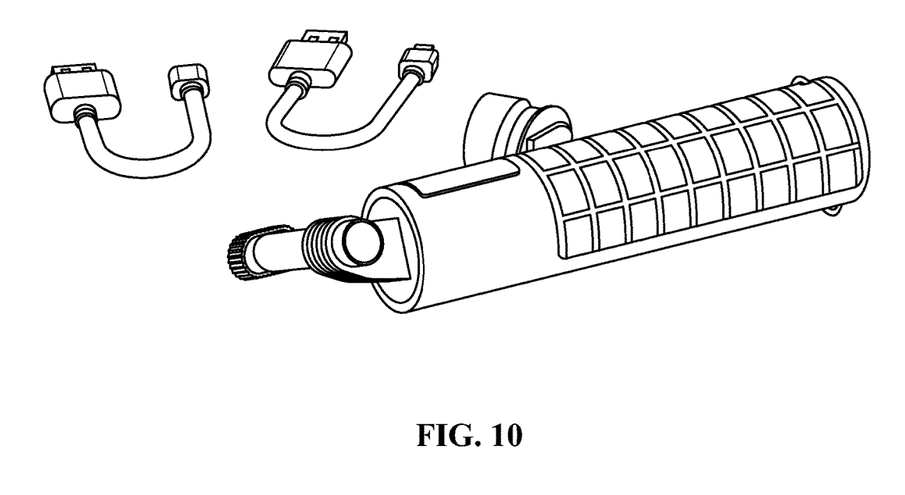
FIG. 10 is a view of a multi-function handgrip according to some embodiments of the present invention.

FIGS. 4A-B illustrate a device 119 mounted onto the powered handgrip. FIG. 5 illustrates the powered handgrip in cross-section showing the relative position of the battery and internal components. FIGS. 6-10 are photographs illustrating exemplary aspects of the powered handgrip.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A powered handgrip, said powered handgrip comprising:
    a handle, said handle comprising:
        a cylindrical handle adapted to be held by a user; and
        a device mounting interface, said device mounting interface adapted to facilitate the mounting of a device thereon, said device mounting interface at a top end of said handle, said device mounting interface comprising three parallel tabs extending vertically from said cylindrical handle; and
        a power interface portion, said power interface portion adapted to provide power to a device mounted upon said device mounting interface; and
        a battery, said battery adapted to provide power to a device mounted upon the device mounting interface of said handle, said battery residing within said cylindrical handle of said handle portion.

2. The powered handgrip of claim 1 wherein said power interface portion comprises one or more electrical connectors, said one or more electrical connectors adapted to couple to the device.

3. The powered handgrip of claim 2 further comprising an access door on said handle portion, said access door covering said one or more electrical connectors.

4. The powered handgrip of claim 3 further comprising a resilient gripping material around the outside of said handle portion.

5. The powered handgrip of claim 1 further comprising an access door on said handle portion.

6. The powered handgrip of claim 1 further comprising a resilient gripping material around the outside of said handle portion.

7. The powered handgrip of claim 1 further comprising a device interface coupled to said device mounting interface, said device interface comprising a threaded stud on a top end of said device interface.

8. The powered handgrip of claim 7 wherein said device interface further comprises two parallel tabs extending from a bottom end of said device interface, said two parallel tabs interleafed with the three parallel tabs extending of said device mounting interface.

9. The powered handgrip of claim 8 wherein said device interface and said device mounting interface are coupled with a locking pin joint.

\* \* \* \* \*